US008040265B2

(12) United States Patent
Cruz-Albrecht et al.

(10) Patent No.: US 8,040,265 B2
(45) Date of Patent: Oct. 18, 2011

(54) DOWN-CONVERTER AND UP-CONVERTER FOR TIME-ENCODED SIGNALS (75) Inventors: Jose Cruz-Albrecht, Oak Park, CA (US); Peter Petre, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 992 days.

(21) Appl. No.: 11/946,850

(22) Filed: Nov. 29, 2007

(65) Prior Publication Data

US 2009/0141780 A1 Jun. 4, 2009

(51) Int. Cl.
H03M 3/00 (2006.01)
(52) U.S. Cl. .......................... 341/143; 375/211; 455/344
(58) Field of Classification Search .......... 341/130–165; 375/22, 40, 239, 282, 293; 455/20, 344; 348/508, E9.038, E9.039
See application file for complete search history.

(56) References Cited

U.S. PATENT DOCUMENTS

| 4,189,621 | A | * | 2/1980 | Scott | 375/239 |
| 5,479,168 | A | * | 12/1995 | Johnson et al. | 341/110 |
| 5,640,161 | A | * | 6/1997 | Johnson et al. | 341/122 |
| 5,808,574 | A | * | 9/1998 | Johnson et al. | 341/110 |
| 7,324,035 | B2 | * | 1/2008 | Harris et al. | 341/155 |
| 7,365,796 | B1 | * | 4/2008 | Woodall | 348/508 |
| 7,724,168 | B1 | * | 5/2010 | Cruz-Albrecht et al. | 341/138 |

* cited by examiner

Primary Examiner — Lam T Mai
(74) Attorney, Agent, or Firm — OConnor & Company

(57) ABSTRACT

The disclosed invention provides apparatus and methods that can convert frequencies of time-encoded signals. In one aspect, a down-converter circuit includes low-pass filters, a switch, a time encoder, and an output low-pass filter. In another aspect, an up-converter circuit includes an analog or digital input time encoder, low-pass filters, a switch, an output time encoder, and a time-encoded band-pass filter. In yet another aspect, a complete receiver system is provided. The receiver system can operate effectively with signals in the radio frequency range.

20 Claims, 6 Drawing Sheets (a)

DOWN-CONVERTER AND UP-CONVERTER FOR TIME-ENCODED SIGNALS

FIELD OF THE INVENTION

The present invention generally relates to communication systems. More specifically, the present invention relates to apparatus and methods that can convert frequencies of time-encoded signals.

BACKGROUND OF THE INVENTION

The continuing decrease in the minimum feature size of modern complementary metal-oxide-semiconductor processes has necessitated a reduction in the circuit supply voltage for reliability and power-dissipation reasons. This reduction is problematic for traditional analog-to-digital conversion schemes because of the reduction in the resolution available within the amplitude range. On the other hand, the decrease in the minimum feature size has a beneficial effect on the obtainable time resolution in the circuitry, owing to the increase in the intrinsic speed of the transistors. Therefore, it is of interest to turn over the amplitude axis to the time axis and to encode information in the latter rather than the former (Roza, *IEEE Transactions on Circuits and Systems—II: Analog and Digital Signal Processing*, Vol. 44, No. 11, 1997). Such a concept is now known as "time encoding."

Time encoding is a real-time, asynchronous mechanism for encoding the amplitude information of an analog band-limited signal into a time sequence, or time codes, based on which the signal can be reconstructed. Time codes can be generated by simple non-linear asynchronous analog circuits with low power consumption.

As described in Lazar and Tóth (*IEEE Transactions on Circuits and Systems—I: Regular Papers*, Vol. 51, No. 10, 2004), which is hereby incorporated by reference, time encoding of a band-limited function x(t) is a representation of x(t) as a sequence of strictly increasing times $t_k$. Alternatively, the output of an encoder can be a digital signal that switches between two values ±b at times $t_k$.

There are two natural requirements that a time-encoding mechanism has to satisfy (Lazar and Tóth, 2004). The first is that the encoding should be implemented as a real-time asynchronous circuit. Second, the encoding mechanism should be invertible, i.e., the amplitude information can be recovered from the time sequence with arbitrary accuracy.

Radio-frequency, or RF, signals are electromagnetic signals, i.e. waveforms with electrical and magnetic properties within the electromagnetic spectrum normally associated with radio wave propagation. Many communication systems modulate electromagnetic signals from baseband to higher frequencies for transmission, and subsequently demodulate those high frequencies back to their original frequency band when they reach the receiver. The original (or baseband) signal may be, for example, data, voice or video. These baseband signals may be produced by transducers such as microphones or video cameras, may be computer-generated, or may be transferred from an electronic storage device. In general, the high frequencies provide longer range and higher capacity channels than baseband signals, and because high-frequency signals can effectively propagate through the air, they can be used for wireless transmissions as well as hard-wired or wave-guided channels.

However, to our knowledge, there have been no successful attempts in the art at frequency conversion of time-encoded signals. There is a need in the art to provide circuits that are capable of being used as building blocks for software-programmable time-encoded radio receivers. What is essentially needed is a complete radio receiver system that includes effective time-encoded filters and down-converters.

SUMMARY OF THE INVENTION

In a first aspect of the present invention, a down-converter circuit is provided, comprising (i) at least two low-pass filters, (ii) a switch, (iii) a time encoder, and (iv) an output low-pass filter.

In some embodiments of this first aspect, the circuit is capable of down-converting in frequency a time-encoded signal and converting said signal into analog format. The circuit, in certain embodiments, is capable of receiving a time-encoded signal in differential format. The time-encoded signal can be generated by a differential output time encoder or by a time-encoded filter with differential output.

In some embodiments of this first aspect, the low-pass filters are capable of rejecting an asynchronous pulse frequency of an input signal. In some embodiments, the time encoder is capable of generating a square wave and controlling the switch. The time encoder can include an external frequency reference.

In a second aspect of the present invention, an up-converter circuit is provided, comprising: (i) an analog or digital input time encoder, (ii) at least two low-pass filters, (iii) a switch, (iv) a second time encoder, and (v) a time-encoded band-pass filter.

In some embodiments of this second aspect, the circuit is capable of up-converting in frequency an analog or digital signal and converting the signal into time-encoded format. In certain embodiments, the input time encoder is capable of providing differential output. The time encoder can be locked to a frequency reference.

In some embodiments of this second aspect, the time encoder is capable of generating a square wave and controlling the switch. Preferably, the time-encoded band-pass filter is programmable.

A third aspect of the present invention provides a receiver system comprising:
(a) an antenna;
(b) a filter;
(c) a time encoder;
(d) a router of time-encoded signals;
(e) a plurality of programmable time-encoder filters including at least one time-encoded input and at least one time-encoded output; and
(f) a plurality of circuits, each circuit comprising at least two low-pass filters, a switch, a time encoder, and an output low-pass filter.

In some embodiments of the third aspect, the circuits are capable of down-converting, in frequency, time-encoded signals and converting the signals into analog format.

In some embodiments, the time encoder contained in element (f) is capable of generating a square wave and controlling the switch. The time encoder can include an external frequency reference.

It is preferred that the receiver system can operate effectively with signals in the radio frequency range. In certain embodiments of the third aspect, the circuits are capable of operating with a pulse rate of at least 20 GHz, 50 GHz, or higher.

DETAILED DESCRIPTION OF EMBODIMENTS OF THE INVENTION

The apparatus and methods of the present invention will now be described in detail by reference to various non-limiting embodiments of the invention.

Unless otherwise indicated, all numbers expressing dimensions, frequencies, efficiencies, and so forth used in the specification and claims are to be understood as being modified in all instances by the term "about." Without limiting the application of the doctrine of equivalents to the scope of the claims, each numerical parameter should at least be construed in light of the number of reported significant digits and by applying ordinary rounding techniques.

The basic principle of operation of a time encoder is as follows, which is a generalized description of time encoders used in some embodiments of the invention. The bounded input signal $x(t)$, $|x(t)| \leq c < b$, is biased by a constant amount before being applied to the integrator. This bias guarantees that the integrator's output is a positive (or negative) increasing (or decreasing) function of time. In steady state, there are two possible operating modes. In the first mode, the output of the time encoder is in state $z(t) = -b$ and the input to a comparator circuit grows from to $-\delta$ to $\delta$. When the output of the integrator reaches the maximum value $\delta$, a transition of the output $z(t)$ from $-b$ to $+b$ is triggered and the feedback becomes negative.

In the second mode of operation, the time encoder is in state $z(t) = b$ and the integrator output steadily decreases from $\delta$ to $-\delta$. When the maximum negative value $-\delta$ is reached $z(t)$ will reverse to $-b$. Thus, while the transition times of the output are non-uniformly spaced, the amplitude of the output signal remains constant. Therefore, a transition of the output from $-b$ to $b$ or vice-versa takes place every time the integrator output reaches the triggering mark $\delta$ or $-\delta$ (called quanta). The time when this quanta is achieved depends on the signal as well as on design parameters. Hence, the time encoder maps amplitude information into timing information. It achieves this by a signal-dependent sampling mechanism.

Preferred embodiments of the present invention utilize one or more filters, preferably time-encoder-based programmable filters. The filters can be used to implement an arbitrary analog linear filter in the pulse domain. The filters can have either a Finite Impulse Response (FIR) or Infinite Impulse Response (IIR). The input to the filter can be an analog signal or a time-encoded pulse signal. The output is time-encoded as a pulse signal.

The filters, in various embodiments, comprise integrators, hysteresis quantizers, and 1-bit digital-to-analog converters (DACs). The circuit internal feedback signals and the circuit output signal can encode analog information in the time domain via asynchronous pulse signals with just two amplitude levels. The information in these signals is preferably not quantized.

The filters take an input and implement an arbitrary analog filter function, with the solution being time-encoded. The filtering operation and the time encoding are preferably performed simultaneously. The only feedback signals in the filter circuit are pulse signals with two amplitude values, the information being encoded in the timing of the signals. The encoded circuit pulse output can provide the desired filter solution with essentially no quantization error.

The filters do not require any analog feedback amplifiers to implement the filtering. Simple 1-bit DACs can be used in the feedback. The gain is used to set the coefficients of the desired filter to be implemented. In certain embodiments, filters implement generic analog active filtering using only 1-bit DACs in the feedback loops, with no analog feedback amplifiers present.

Filter circuits provided in the present invention avoid accuracy limitations of analog computing as well as speed limitations of analog-to-digital conversion. When ideal elements are used, the filters can provide an exact solution. In addition, the implementation of these filters as described herein is more compact than that of equivalent analog circuits or digital circuits. The filters are suitable for compact implementation in very-large-scale integration (VLSI) technology.

Figure 1:
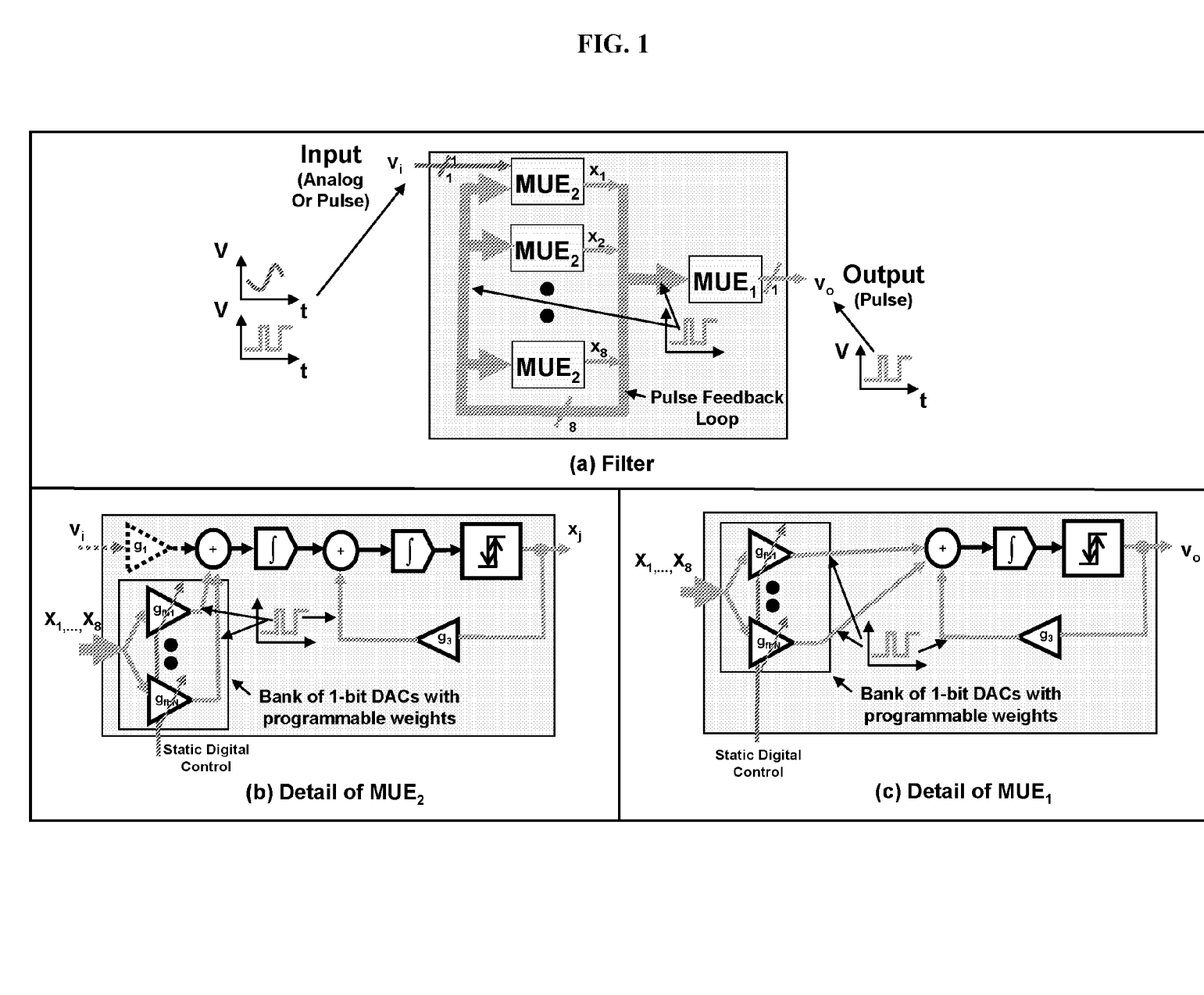
FIG. 1 is a depiction of a pulse domain filter which can be used in some embodiments of the invention.

FIG. 1 is a non-limiting illustration of one such filter in the pulse domain. The filter circuit of FIG. 1 can take analog or time-encoded signals as an input. The circuit can do an arbitrary filtering operation, such as band-pass filtering. The output signal is time-encoded.

FIG. 1(a) shows the architecture of the filter circuit. In this example, the circuit is an 8th-order filter, wherein the filter order is defined as the order of the denominator polynomial of the filter transfer function; or alternatively, as the total number of individual poles, either real or complex (with each complex conjugate pole pair counted here as two individual poles). The filter of FIG. 1 contains two types of internal blocks, denoted as Multiple-input Unit Element of Second Order ($MUE_2$) and as Multiple-input Unit Element of First Order ($MUE_1$).

The input to the filter can be either an analog signal or a time-encoded pulse signal. The internal signals connecting all internal $MUE_2$ blocks and the $MUE_1$ are time-encoded asynchronous pulse signals. They have only two amplitude levels. However, they can encode analog information in the timing of the pulses. The output signal is also a time-encoded asynchronous pulse signal. For the case of an 8th-order filter, the circuit uses eight $MUE_2$ blocks and one $MUE_1$ block. The input signal is fed into one of the $MUE_2$ blocks. Each of the eight $MUE_2$ blocks generate one state asynchronous pulse signal, $x_i$ ($i=1, \ldots, 8$). The eight state pulse signals are recurrently connected to the inputs of the $MUE_2$ blocks and also connected to the inputs of the final $MUE_1$ block.

FIG. 1(b) shows detail of the $MUE_2$ blocks. The $MUE_2$ block contains a bank of asynchronous 1-bit DACs (Digital to Analog Converters). They convert a pulse voltage signal at their input into a pulse current signal at their output. The transconductance gain of each DAC can be adjusted, if desired, by a static digital control. Adjustment of these DAC gains allows a person of ordinary skill in the art to program arbitrary filter transfer functions in the filter circuit. One of the $MUE_2$ blocks also contains an input gain cell. When the input to the filter is a time-encoded signal, this gain cell can also optionally be a 1-bit DAC. The rest of the $MUE_2$ is composed of integrators, a hysteresis quantizer, and a self-feedback 1-bit DAC.

FIG. 1(c) shows detail of the $MUE_1$ block. This block does addition in the pulse domain. It contains a bank of programmable asynchronous 1-bit DACs. These DAC gains are also set to program arbitrary filter transfer functions in the filter circuit. The rest of the $MUE_1$ is composed an integrator, a hysteresis quantizer, and a self-feedback 1-bit DAC.

FIG. 2(a) shows a down-converter circuit according to preferred embodiments. FIG. 2(b) is a symbolic diagram of signal spectrums at several nodes of the circuit when the input signal is a single tone. The input to the circuit is a time-encoded signal in differential format. This signal can be generated by a differential output time encoder or by a time-encoded filter with differential output.

Figure 2:
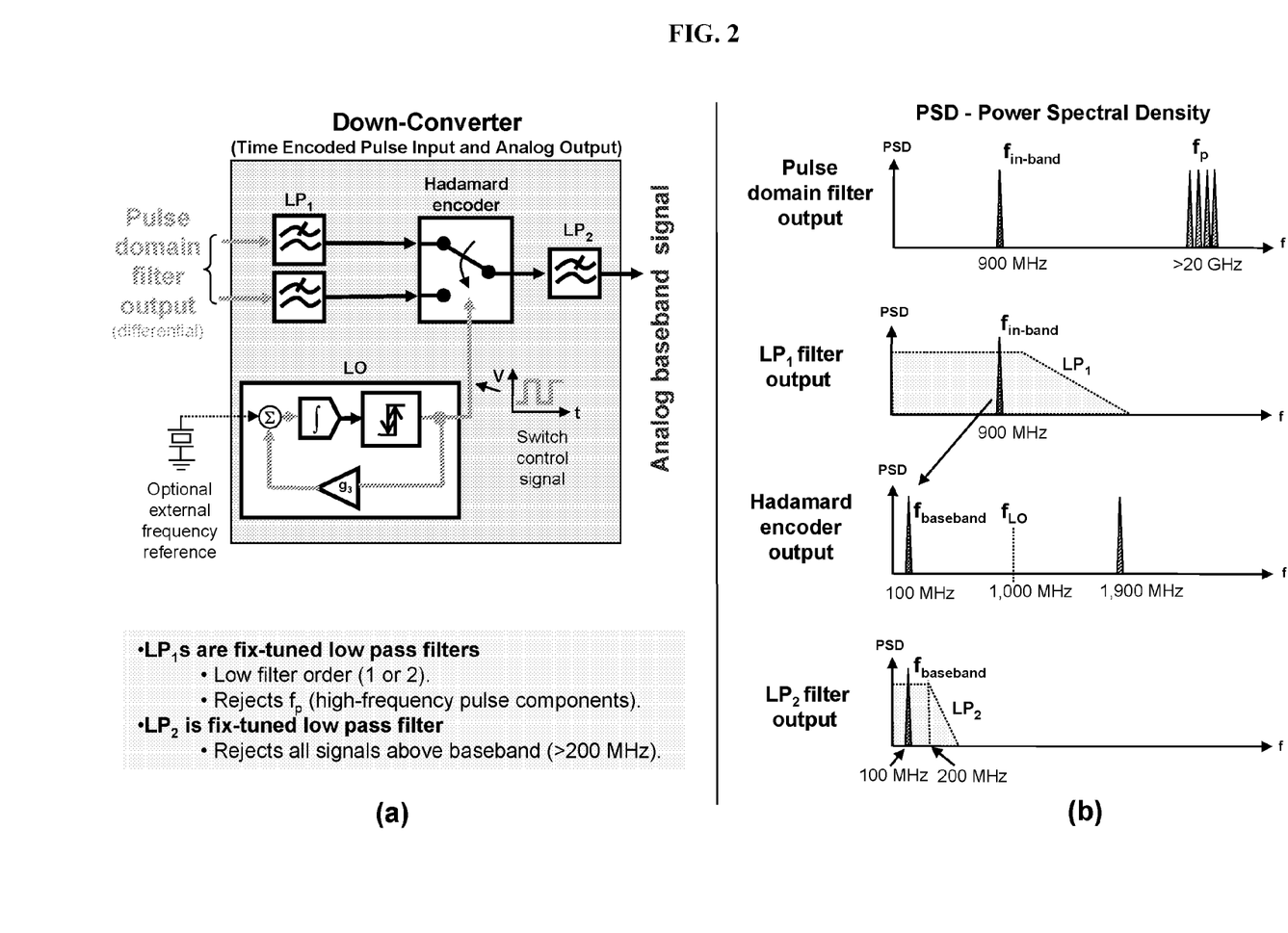
FIG. 2 is an illustration of a circuit to down-convert time-encoded signals, according to one preferred embodiment.

The circuit illustrated in FIG. 2 contains:
(i) two fixed low-pass filters ($LP_1$) that reject the asynchronous pulse frequency of the input signals;
(ii) a switch;
(iii) a time encoder (labeled as LO in the figure) that generates a square wave and controls the switch; and
(iv) an output low-pass filter ($LP_2$) to reject an undesired signal image.

In FIG. 2, the $LP_1$ filters are fix-tuned low-pass filters of low filter order (1 or 2). They reject high-frequency pulse components (such as >20 GHz in FIG. 2). $LP_2$ is a fix-tuned low-pass filter that rejects all signals above baseband (>200 MHz in FIG. 2).

One skilled in the art will appreciate that several types of switches or multiplexers can be used. FIG. 2 shows the switch to be a Hadamard encoder. In preferred embodiments, the switch of the down-converter circuit is capable of performing a Hadamard transform on input signals. The Hadamard transform performed in the switch can be a fast Hadamard transform, a discrete Hadamard transform, or some other type of Hadamard transform.

A simulation of the circuit of FIG. 2 is described in Example 1 below.

Figure 3:
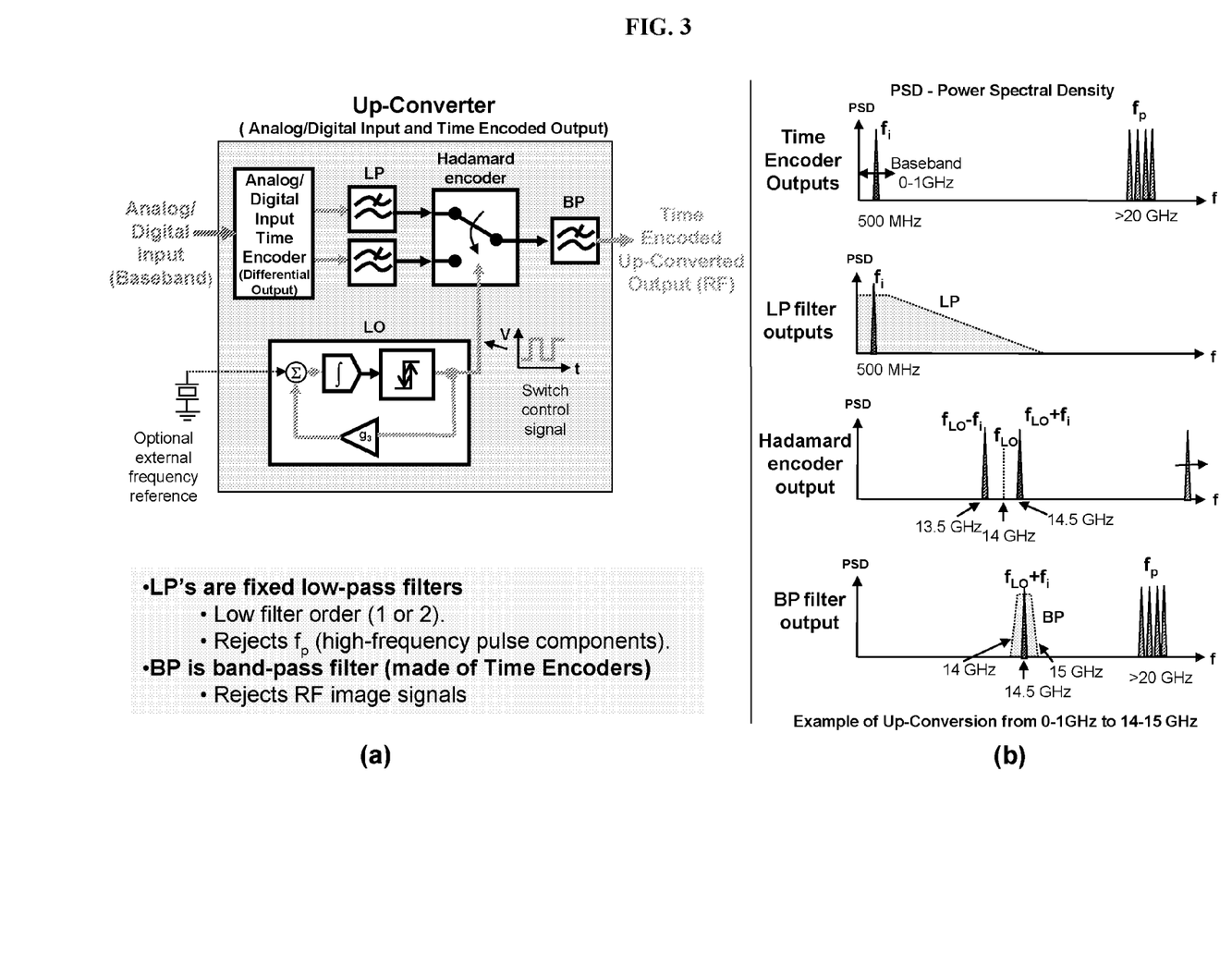
FIG. 3 is an illustration of a circuit to up-convert from baseband to radio frequency with the input being analog or digital and the output being time-encoded.

In some embodiments, a similar circuit can be used to do the reverse operation. FIG. 3 shows one such up-converter circuit. This circuit up-converts an analog or digital input signal, with the output being time encoded. FIG. 3(a) shows a diagram of the circuit. FIG. 3(b) shows a symbolic diagram of signal spectrums at several nodes of the circuit when the input signal is a single tone.

The circuit of FIG. 3 contains:
(i) a time encoder;
(ii) two fixed low-pass filters;
(iii) a switch;
(iv) a time encoder (labeled as LO in the figure) generating a square wave and controlling the switch; and
(v) a programmable time-encoded band pass filter.

Figure 4:
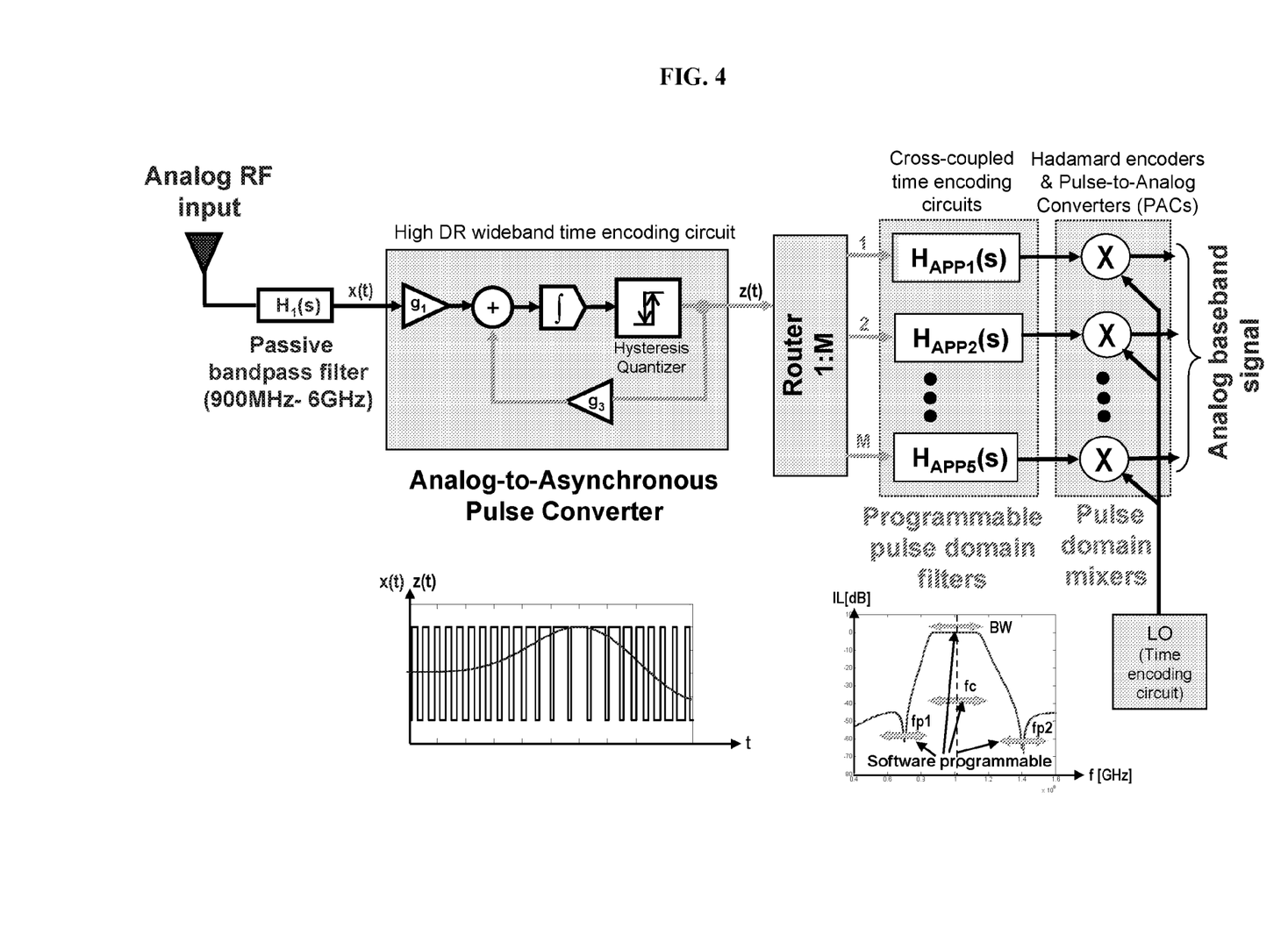
FIG. 4 is a diagram of a receiver system with time-encoded filter and down-converter of time-encoded signals.

FIG. 4 shows a diagram of a complete receiver system provided by some embodiments of the invention. The receiver system comprises an antenna, a time encoder, a router, an array of time-encoded based programmable filters, and down-converter circuits. The receiver system shown in FIG. 4 converts an analog radio-frequency signal (which can be in the GHz range) into an analog baseband signal, by utilizing time-encoded down-converting.

The down-converter circuits, up-converter circuits, and time-encoded based circuits of the receiver can be efficiently implemented in integrated circuits, as will be recognized by a skilled artisan. In state-of-the-art indium-phosphide technology, the circuits can operate with a pulse rate of 20 GHz, 50 GHz, or even higher.

EXAMPLES

Example 1

Simulation Results of a Filter with a Down-Converter Provided by the Invention

In this example, a simulation of the circuit using multi-tone input signals is carried out. The model for the simulation includes an input multi-tone analog signal; a filter similar to that shown in FIG. 1 but with differential output that is time-encoded; and a down-converter circuit as shown in FIG. 2.

Figure 5:
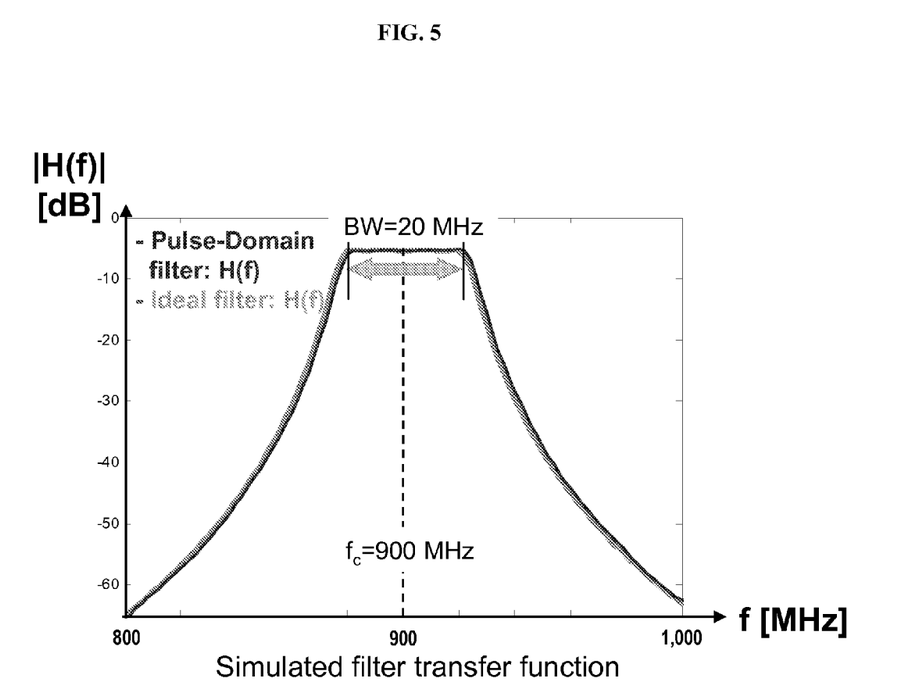
FIG. 5 is a graph of the filter transfer function for a band-pass time-encoder filter (Chebychev 8th-order filter).

FIG. 5 shows the simulated transfer characteristic of the time-encoding filter. In this example, the weights of the filter are adjusted to produce a narrowband band-pass characteristic with a bandwidth of 20 MHz centered at 900 MHz. The output of this filter is used to test a circuit of the invention. The data of FIG. 5 was extracted from a Fast Fourier Transform (FFT) of a time-domain simulation of the impulse response of the filter.

Figure 6:
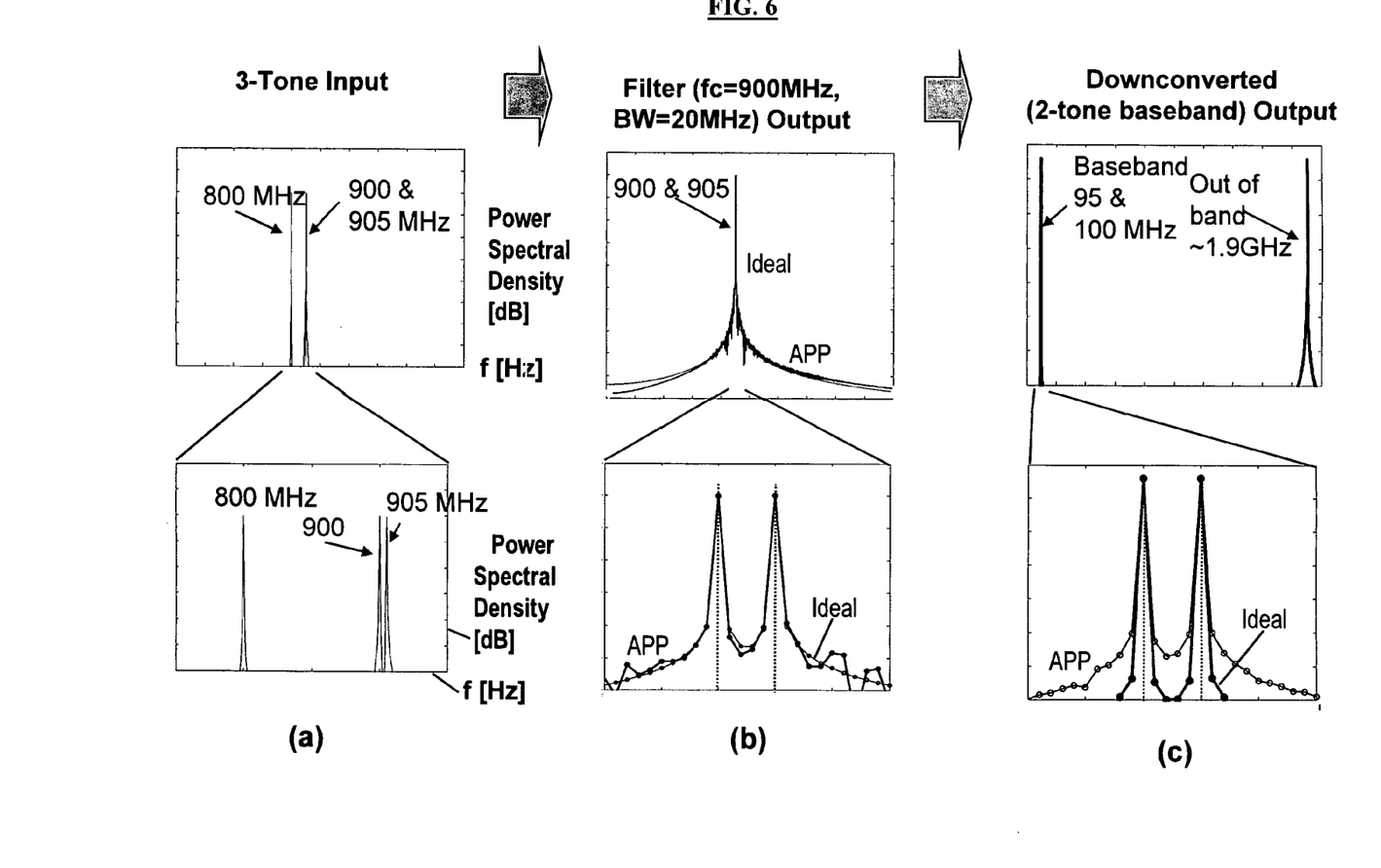
FIG. 6 displays the simulation results corresponding to a filter with the down-converter, according to an example of the invention.

FIG. 6 shows the simulation results. All the graphs were generated via FFT from time-domain simulation data. FIG. 6(a) shows the spectrum of the analog input signal. The top graph of FIG. 6(a) shows the spectrum from 0 to 2 GHz. The bottom graph of FIG. 6(a) shows more detail for a narrow frequency range. In this example, a 3-tone analog signal is implemented, with 2 tones within the narrow passband of the filter.

The two graphs of FIG. 6(b) show the spectrum of the time-encoded signals at the output of the filter. This signal contains the two desired tones at 900 MHz and 905 MHz.

The top graph of FIG. 6(c) shows the spectrum of the analog signals at the output of the Hadamard encoder of the down-converter. The bottom graph of FIG. 6(c) shows the two desired down-converted tones.

In this detailed description, reference has been made to multiple embodiments and to the accompanying drawings in which is shown by way of illustration specific exemplary embodiments in which the invention may be practiced. These embodiments are described in sufficient detail to enable those skilled in the art to practice the invention, and it is to be understood that modifications to the various disclosed embodiments may be made by a skilled artisan. Other embodiments that do not provide all of the features and advantages set forth herein may be utilized, without departing from the spirit and scope of the present invention. Such modifications and variations are considered to be within the scope of the invention defined by the appended claims.

The invention claimed is:

1. A down-converter circuit comprising:
(i) at least two low-pass filters;
(ii) a switch;
(iii) a time encoder; and
(iv) an output low-pass filter.

2. The circuit of claim 1, wherein said down-converter circuit is capable of down-converting in frequency a time-encoded signal and converting said time-encoded signal into analog format.

3. The circuit of claim 1, wherein said circuit is capable of receiving a time-encoded signal in differential format.

4. The circuit of claim 3, wherein said signal is generated by a differential output time encoder or by a time-encoded filter with differential output.

5. The circuit of claim 1, wherein said at least two low-pass filters (i) are capable of rejecting an asynchronous pulse frequency of an input signal.

6. The circuit of claim 1, wherein said time encoder (iii) is capable of generating a square wave and controlling said switch (ii).

7. The circuit of claim 1, wherein said time encoder (iii) includes an external frequency reference.

8. An up-converter circuit comprising:
(i) an analog or digital input time encoder;
(ii) at least two low-pass filters;
(iii) a switch;
(iv) a second time encoder; and
(v) a time-encoded band-pass filter.

9. The circuit of claim 8, wherein said circuit is capable of up-converting in frequency an analog or digital signal and converting said signal into time-encoded format.

10. The circuit of claim 8, wherein said input time encoder (i) is capable of providing differential output.

11. The circuit of claim 8, wherein said time encoder (iv) is locked to a frequency reference.

12. The circuit of claim 8, wherein said time encoder (iv) is capable of generating a square wave and controlling said switch (iii).

13. The circuit of claim 8, wherein said time-encoded band-pass filter (v) is programmable.

14. A receiver system comprising:
  (a) an antenna;
  (b) a filter;
  (c) a time encoder;
  (d) a router of time-encoded signals;
  (e) a plurality of programmable time-encoder filters including at least one time-encoded input and at least one time-encoded output; and
  (f) a plurality of circuits, each circuit comprising at least two low-pass filters, a switch, a time encoder, and an output low-pass filter.

15. The receiver system of claim 14, wherein said circuits (f) are capable of down-converting in frequency time-encoded signals and converting said signals into analog format.

16. The receiver system of claim 14, wherein said time encoder contained in element (f) is capable of generating a square wave and controlling said switch.

17. The receiver system of claim 14, wherein said time encoder contained in element (f) includes an external frequency reference.

18. The receiver system of claim 14, wherein said circuits (f) are capable of operating with a pulse rate of at least 20 GHz.

19. The receiver system of claim 14, wherein said circuits (f) are capable of operating with a pulse rate of at least 50 GHz.

20. A receiver system as claimed in claim 14 which can operate effectively with signals in the radio frequency range.

* * * * *